(12) United States Patent
Haake et al.

(10) Patent No.: US 8,571,702 B1
(45) Date of Patent: Oct. 29, 2013

(54) PICK-TO-TOTE OPTIMIZATION

(75) Inventors: Paul N. Haake, Seattle, WA (US); Sarah T. Rowe, Seattle, WA (US); Sean Joseph Henry Oczkowski, Waterloo (CA)

(73) Assignee: Amazon Technologies, Inc., Reno, NV (US)

( * ) Notice: Subject to any disclaimer, the term of this patent is extended or adjusted under 35 U.S.C. 154(b) by 480 days.

(21) Appl. No.: 12/827,048

(22) Filed: Jun. 30, 2010

(51) Int. Cl.
*G06F 7/00* (2006.01)

(52) U.S. Cl.
USPC .......... 700/216; 700/213; 700/217; 705/26.1; 705/29; 705/7.31

(58) Field of Classification Search
USPC ....................................................... 700/216
See application file for complete search history.

(56) References Cited

U.S. PATENT DOCUMENTS

| | | | |
|---|---|---|---|
| 6,208,908 B1 * | 3/2001 | Boyd et al. | 700/216 |
| 6,876,958 B1 * | 4/2005 | Chowdhury et al. | 703/7 |
| 7,295,990 B1 * | 11/2007 | Braumoeller et al. | 705/7.31 |
| 8,073,562 B2 * | 12/2011 | Danelski | 700/216 |
| 2005/0043850 A1 * | 2/2005 | Stevens et al. | 700/213 |
| 2006/0142895 A1 * | 6/2006 | Waddington et al. | 700/216 |
| 2008/0167884 A1 * | 7/2008 | Mountz et al. | 705/1 |
| 2010/0250384 A1 * | 9/2010 | Bhargava | 705/26 |
| 2012/0101627 A1 * | 4/2012 | Lert | 700/216 |

\* cited by examiner

*Primary Examiner* — Gene Crawford
*Assistant Examiner* — Kyle Logan
(74) *Attorney, Agent, or Firm* — Hope Baldauff, LLC (57) ABSTRACT

Technologies are described herein for optimizing pick-to-tote operations. Each pick location for items in an inventory picking area is assigned a sequence number representing a relative position along a pick path through the inventory picking area. A number of tote pick lists are selected from a set of pending pick lists for the pick-to-tote operation, such that the range of sequence numbers across all the pick locations identified in the selected pick list is minimized. In this way, the required distance inventory personnel must travel along the pick path while picking the specified items and placing them into totes is reduced.

20 Claims, 5 Drawing Sheets

PICK-TO-TOTE OPTIMIZATION

BACKGROUND

Many types of products may be ordered over the phone or online for delivery directly to a customer, including grocery items and other consumables. Efficient handling and shipping of consumable products may present special challenges to merchants of such products. For example, the perishable nature of many consumable products may require that items be picked from inventory very close to the time of delivery in an efficient and timely manner with minimal cost of labor.

The items for a particular order may be picked directly into totes that are then delivered to the customer, thus eliminating the time and cost of repacking the items for delivery. These picking operations are referred to as "pick-to-tote operations." To minimize the cost of labor associated with pick-to-tote operations, a single pick-to-tote operation performed by inventory personnel may involve a number of totes to be packed with items for multiple, different orders. In addition, the items for a particular order may be picked to multiple totes in different pick-to-tote operations, depending on the storage locations or picking zones of the items in the inventory facilities of the merchant.

It is with respect to these and other considerations that the disclosure made herein is presented.

DETAILED DESCRIPTION

The following detailed description is directed to technologies for optimizing pick-to-tote operations. According to embodiments, when inventory personnel begin a pick-to-tote operation, a number of tote pick lists for the operation are selected from a set of pending pick lists in the merchant system. The tote pick lists are selected such that the pick locations, or "bins," for the order items identified in all of the selected pick lists are closest to one another relative to a pick path through the pick locations. In this way, each pick-to-tote operation may be optimized to reduce the required distance inventory personnel must travel along the pick path while picking the specified items and placing them into totes.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
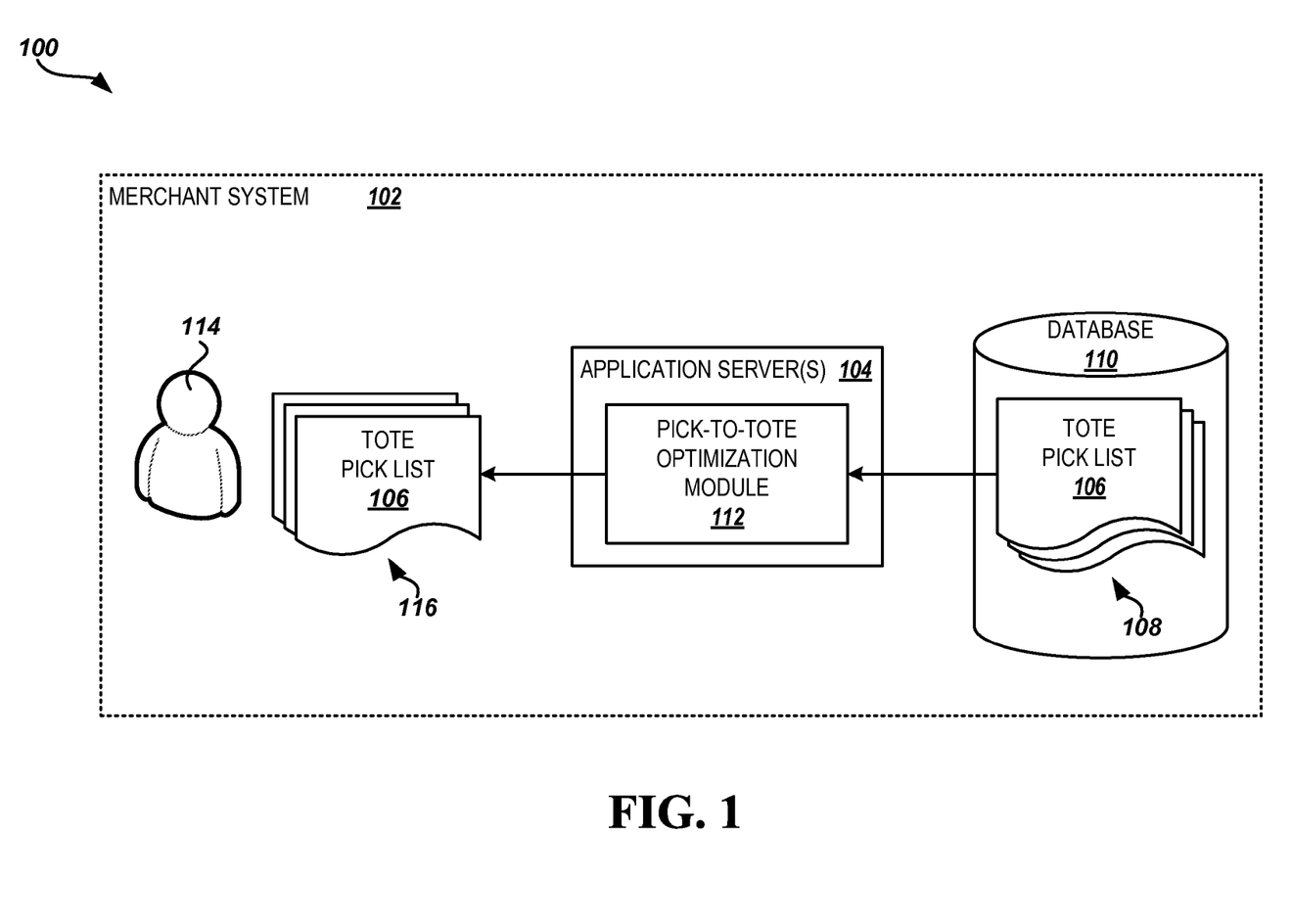
FIG. 1 is a system diagram showing aspects of an illustrative operating environment for optimizing pick-to-tote operations, including several software and hardware components provided by embodiments presented herein.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing the methods for optimizing pick-to-tote operations, according to embodiments provided herein. The environment 100 includes a number of application servers 104 that provide various application services to a merchant system 102. The application servers 104 may execute a number of modules in order to provide the services to the merchant system 102. The modules may execute on a single application server 104 or in parallel across multiple application servers in the merchant system 102. In addition, each module may consist of a number of subcomponents executing on different application servers 104 or other computing devices in the merchant system 102. The modules may be implemented as software, hardware, or any combination of the two.

According to embodiments, when an order is received by the merchant system 102, each of the individual items in the order are assigned to containers, or "totes," into which the items of the order will be placed for delivery to the customer. This process is referred to as "cartonization." The cartonization process may assign each item of the order to a tote depending upon the weight and/or size of the item; the capacity of the totes; the packing parameters for the item, e.g. must the item be kept cold in transit or is the item fragile; and the like. The cartonization process may assign several items from the order to the same tote, and one order may require several totes to hold all the items in the order. For each tote assigned to an order, the cartonization process may generate a tote pick list 106 specifying the type and quantity of the items in the order that are to be placed in an associated tote for delivery to the customer, as will be described in more detail below in regard to FIG. 3. A set of pending pick lists 108 for currently open orders in the merchant system 102 may be stored in a data storage system, such as the database 110 shown in FIG. 1.

A pick-to-tote optimization module 112 executes on the application servers 104. The pick-to-tote optimization module 112 selects a number of tote pick lists 106 from the set of pending pick lists 108 for pick-to-tote operations to be performed by inventory personnel 114. As will be described in more detail below, the selected pick lists 116 are determined in such a way as to optimize the pick-to-tote operation by selecting from the set of pending pick lists 108 tote pick lists 106 having items located in pick locations that are closest to one another along a pick path through the inventory picking area.

Figure 2:
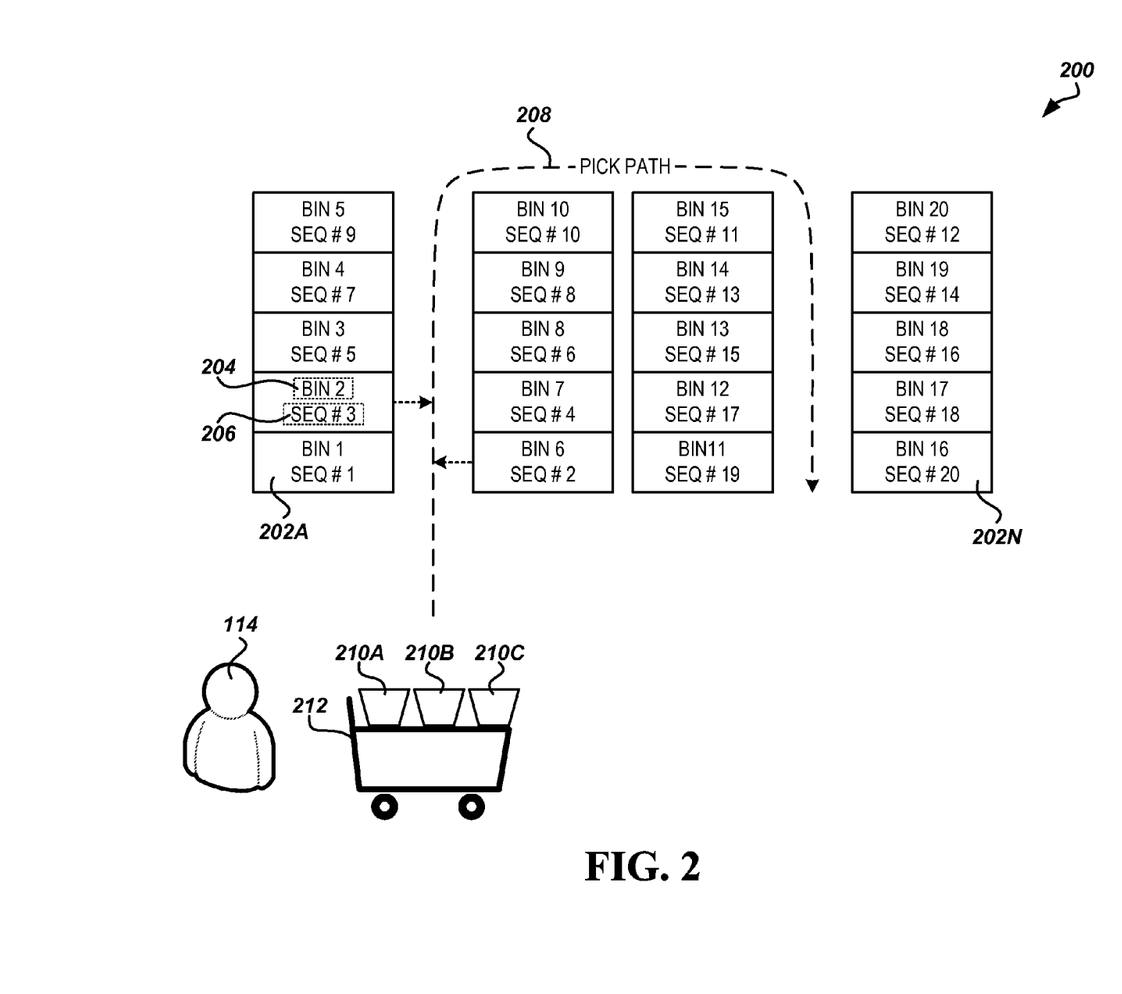
FIG. 2 is a block diagram showing aspects of an illustrative inventory picking area and picking operations, according to embodiments presented herein.

FIG. 2 shows aspects of an illustrative inventory picking area 200 in the merchant's storage facilities, according to embodiments presented herein. Each item offered for purchase by the merchant may be stocked in individual pick locations 202A-202N (referred to herein generally as pick location 202), in the inventory picking area 200. According to embodiments, a particular pick location 202 may contain items of only one type, i.e. one stock-keeping unit ("SKU"). The pick locations 202 may be bins, shelves, palettes, racks, and the like. In one embodiment, all the pick locations 202 are a standard size. In another embodiment, the pick locations 202 may be of varying size, allowing for the storage of differently sized items.

According to embodiments, each pick location 202 is assigned a location ID 204 utilized by the pick-to-tote optimization module 112 and/or other modules of the merchant system 102 to identify the pick location. In addition, each pick location 202 is assigned a sequence number 206. The sequence number 206 represents a relative position of each pick location 202 along a pick path 208 through the inventory picking areas 200 utilized by inventory personnel 114 in pick-to-tote operations. As may be seen in the figure, the location ID 204 and the sequence number 206 may not be the same value and may not have the sequential scheme.

In one embodiment, several pick locations 202 may be assigned the same sequence number 206. For example, the inventory picking area 200 may contain case-flow racking having multiple pick locations 202 vertically in a single rack. Each of the pick locations 202 in a single rack may be assigned the same sequence number 206, in that they share the same relative position along the horizontal pick path 208. In another embodiment, the sequence number 206 for each pick location 202 may relate the distance of the location from the start of the pick path 208. In this embodiment, the difference between the sequence numbers 206 of two neighboring pick locations 202 may indicate the distance between the locations along the pick path 208.

In a further embodiment, the sequence number 206 may relate a two-dimensional position of the pick location 202 within the inventory picking area 200 and calculating the distance between two pick locations may involve calculating the distance between the two-dimensional positions along one of a number of pick paths. Other methods of assigning sequence numbers 206 to pick locations 202 may be imagined by one skilled in the art, and it is intended that all such methods be included in this application.

According to embodiments, inventory personnel 114 executing a pick-to-tote operation may load a number of totes 210A-210C (referred to herein generally as tote 210) onto an inventory cart 212 and then initiate execution of the pick-to-tote optimization module 112 to select a tote pick list 106 from the set of pending pick lists 108 for each of the totes 210. As will be described below in regard to FIG. 4, the pick-to-tote optimization module 112 selects the tote pick lists 106 from the set of pending pick lists 108 in such a way that the overall range of sequence numbers 206 for the pick locations 202 of the items in the selected pick lists 116 is minimized, according to one embodiment. It will be appreciated that minimizing the overall range of sequence numbers 206 for the pick locations 202 involved in the pick-to-tote operation will reduce the distance the inventory personnel 114 must cover while picking the items specified in the selected pick lists 116, thus resulting in a more optimal pick-to-tote operation.

Figure 3:
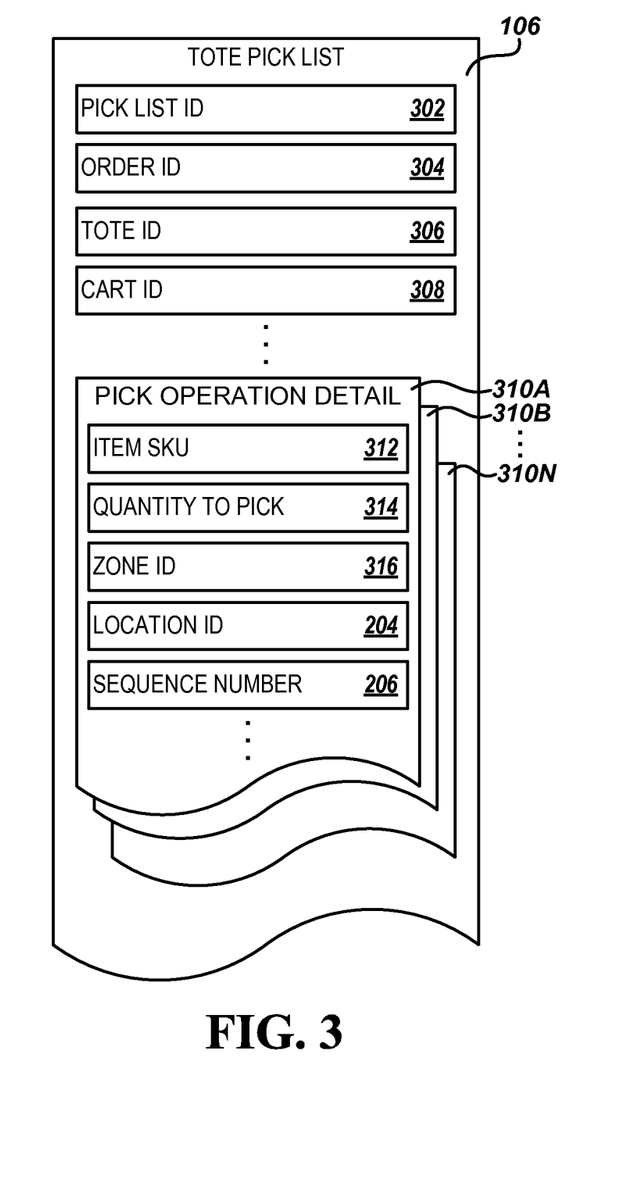
FIG. 3 is a data structure diagram illustrating a number of data elements maintained for a tote pick list, according to embodiments presented herein.

FIG. 3 is a data structure diagram showing a number of data elements stored in a data structure. It will be appreciated by one skilled in the art that the data structure shown in the figure may represent a database table, an object stored in a computer memory, a programmatic structure, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

Specifically, FIG. 3 shows one example of data elements that may be contained in the tote pick list 106, according to embodiments. As described above, the tote pick list 106 stores the type and quantity of items in an order that are to be placed in an associated tote 210 for delivery to the customer. In one embodiment, the tote pick list 106 is utilized by inventory personnel 114 in pick-to-tote operations to pick the items for the order from the associated pick location 202 within the inventory picking area 200. The tote pick list 106 may contain a pick list ID 302 that uniquely identifies the pick list to the pick-to-tote optimization module 112 and/or other modules of the merchant system 102. The tote pick list 106 may also contain an order ID 304 that identifies the order from which the items to be picked belong.

The tote pick list 106 may further contain a tote ID 306 identifying a physical tote 210 to which the specified items are to be picked. The tote ID 306 may be assigned to the tote pick list 106 when the pick-to-tote optimization module 112 selects the pick list for a specific pick-to-tote operation initiated by inventory personnel 114 after selecting a number of actual totes 210 to load on the cart 212 for picking, for example. The tote pick list 106 may also contain a cart ID 308 identifying the cart 212 on which the physical tote 210 identified by the tote ID 306 is located.

The tote pick list 106 also contains one or more pick operation details 310A-310N (referred to herein generally as pick operation detail 310). Each pick operation detail 310 provides information regarding a particular item to be picked from a specified pick location 202 and placed into the associated tote 210. Each pick operation detail 310 includes an item SKU 312 identifying the item that is to be picked. The pick operation detail 310 also includes a quantity to pick 314 indicating the number of the items with the associated item SKU 312 to pick from the specified pick location 202 and place into the tote 210. It will be appreciated that the quantity to pick 314 may be a different value from the quantity of the item in the order. This may be the case when the total of the quantity of the item in the order cannot fit in a single tote 210, for example.

The pick operation detail 310 may include a zone ID 316 identifying one of a number of separate inventory picking areas 200, or "zones," within the merchant's storage facilities. For example, the inventory picking areas 200 may be divided into zones based on the storage requirement of the items, such as an ambient zone for dry goods; a chilled zone for milk, eggs, meats, and the like; and a frozen zone for ice cream and frozen vegetables. The pick operation detail 310 may also include the location ID 204 assigned to the pick location 202 in the inventory picking area 200 where the item identified by the item SKU 312 is stocked. The pick operation detail 310 further includes the sequence number 206 assigned to the pick location 202 identified by the location ID 204.

As will be described in further detail below in regard to FIG. 4, the pick-to-tote optimization module 112 uses the sequence numbers 206 of the pick locations 202 identified in the tote pick list 106 to determine the proximity of each pick location in the pick list to the other pick locations in relation to the pick path 208. It will be appreciated that the location ID 204 and/or sequence number 206 for the pick location 202 of the item identified by the item SKU 312 may be obtained from a data structure other than the pick operation detail 310, and may be retrieved based on the item SKU 312 or a unique combination of the item SKU and the location ID 204, for example. It will be further appreciated that the tote pick list 106 may contain additional data elements beyond those shown in FIG. 3 and described above that are utilized by the pick-to-tote optimization module 112 and/or other modules of the merchant system 102.

Figure 4:
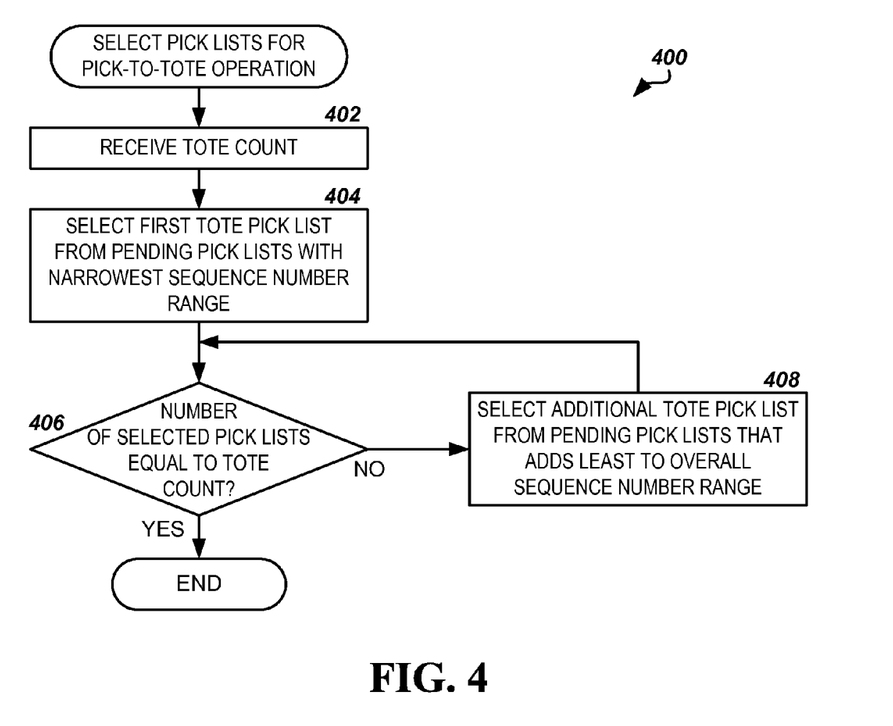
FIG. 4 is a flow diagram for the optimized selection of tote pick lists for a pick-to-tote operation, according to embodiments described herein.

Turning now to FIG. 4, additional details will be provided regarding the embodiments presented herein for optimizing pick-to-tote operations. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for selecting a number of tote pick lists 106 from the currently pending pick lists 108 for optimized pick-to-tote operations, according to embodiments described herein. In one embodiment, the routine 400 is performed by the pick-to-tote optimization module 112 executing on the application servers 104 in the merchant system 102. It will be appreciated that the routine 400 may also be performed by another module or component of the merchant system 102, or by a combination of modules and components.

The routine 400 begins at operation 402, where the pick-to-tote optimization module 112 receives a tote count for the number of totes 210 involved in the pick-to-tote operation. For example, inventory personnel 114 initiating the pick-to-tote operation may load five empty totes 210 onto an inventory cart 212 and utilize an inventory control device to scan a barcode or other identifier on each of the totes. This will provide both tote count involved in the pick-to-tote operation as well as the tote ID 306 for each of the individual, physical totes 210 for use by the pick-to-tote optimization module 112.

From operation 402, the routine 400 proceeds to operation 404, where the pick-to-tote optimization module 112 identifies a first tote pick list 106 from the currently pending pick lists 108 and adds the tote pick list to the selected pick lists 116. According to one embodiment, the pick-to-tote optimization module 112 identifies the first tote pick list 106 as the tote pick list in the currently pending pick lists 108 having the narrowest sequence number range. The pick-to-tote optimization module 112 may determine the sequence number range for a particular tote pick list 106 by calculating the difference between the sequence numbers 206 of the pick operation details 310 with the highest and lowest sequence numbers, for example.

It will be appreciated that the sequence number range for a particular tote pick list 106 is representative of the distance along the pick path 208 that inventory personnel 114 must cover in performing the pick operations corresponding to the pick operation details 310 contained therein. In one embodiment, the cartonization process may take the sequence number 206 or other indication of the pick location 202 for each item into consideration when assigning items in an order to totes 210. Thus, the individual tote pick list 106 in the set of pending pick lists 108 may already be optimized by pick path sequence number.

In alternative embodiments, the pick-to-tote optimization module 112 may identify the first tote pick list 106 based on other criteria, such as a tote pick list from the order with the highest priority, the earliest delivery date, or the like. In a further embodiment, the pick-to-tote optimization module 112 may select the first tote pick list 106 from the currently pending pick lists 108 based on no criteria, e.g. at random or the next pending tote pick list from the set. It is intended that this application include all such methods for selecting the first tote pick list 106 from the currently pending pick lists 108.

The routine 400 then proceeds from operation 404 to operation 406, where the pick-to-tote optimization module 112 determines whether the number of tote pick lists 106 added to the selected pick lists 116 is equal to the tote count received in operation 402. If the number of selected pick lists 116 does not equal the tote count, then the routine 400 proceeds from operation 406 to operation 408, where the pick-to-tote optimization module 112 identifies an additional tote pick list 106 in the currently pending pick lists 108 that adds the least to the overall sequence number range of the currently selected pick lists 116, and adds that tote pick list to the selected pick lists. In a similar manner as that described in regard to operation 404, the pick-to-tote optimization module 112 may determine the overall sequence number range for the selected pick lists 116 by calculating the difference between the sequence numbers 206 of the pick operation details 310 with the highest and lowest sequence numbers from among all the tote pick lists 106 in the selected pick lists.

In one embodiment, the set of currently pending pick lists 108 may represent the tote pick lists 106 for all open orders in the merchant system 102. In another embodiment, the set of pending pick lists 108 from which the pick-to-tote optimization module 112 will choose the selected pick lists 116 may be limited to a subset of the tote pick lists 106 in the database 110 based on one or more criteria. For example, the set of pending pick lists 108 may be selected from orders having a same priority or scheduled for departure from the warehouse at the same time. Similarly, the set of selected pick lists 108 may be limited to tote pick lists 106 for items stocked in the same zone or for totes 210 scheduled to be delivered on the same truck. Other criteria for limiting the tote pick lists 106 in the set of pending pick lists 108 may be imagined by one skilled in the art, and it is intended that this application include all such criteria.

From operation 408, the routine 400 returns to operation 406 where the process is repeated until the number of selected pick lists 116 equals the tote count received in operation 402. Once the number of selected pick lists 116 equals the tote count, the routine 400 ends.

Figure 5:
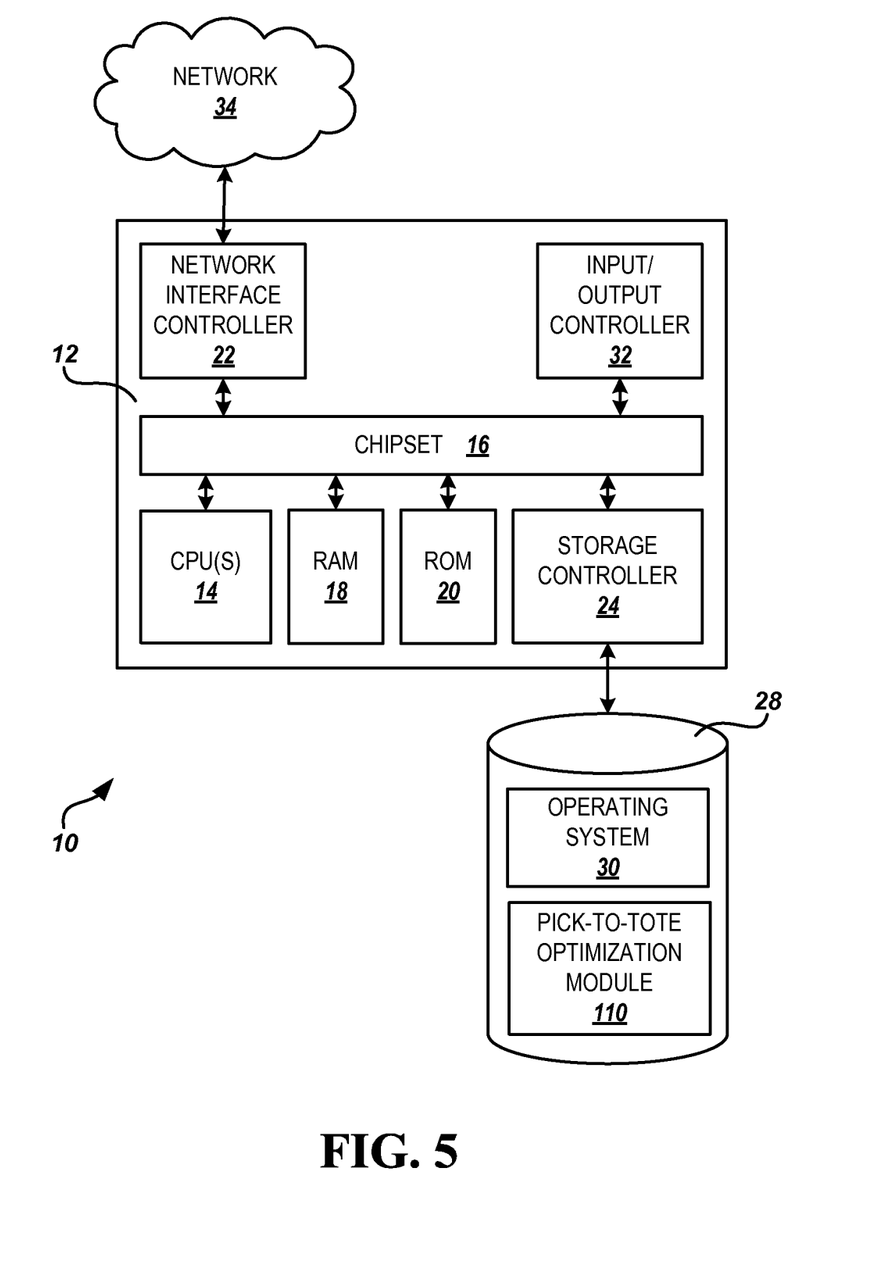
FIG. 5 is a computer architecture diagram showing an illustrative computer hardware architecture for computing devices described in embodiments presented herein.

FIG. 5 shows an example computer architecture 10 for a computer 12 capable of executing the software components described herein for optimizing pick-to-tote operations, in the manner presented above. The computer architecture 10 shown in FIG. 5 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104 or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network 34, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 34, such as other application servers 104, inventory control devices utilized by inventory personnel 114, a data storage system in the merchant system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available non-transitory media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the pick-to-tote optimization module 112 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for optimizing pick-to-tote operations, as described above in regard to FIG. 4.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for optimizing pick-to-tote operations are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereon that, when executed by a computer, cause the computer to:
   receive a tote count indicating a number of tote pick lists for selection;
   select a first tote pick list having a narrowest sequence number range from a set of pending pick lists, wherein the sequence number range of a tote pick list represents a maximum distance along a pick path between pick locations for items identified in the tote pick list;
   select an additional tote pick list adding the least to an overall sequence number range of the selected pick lists from the set of pending pick lists; and
   repeat the selection of additional tote pick lists until the number of the selected pick lists equals the tote count.

2. The computer-readable storage medium of claim 1, wherein each pick location for items identified in the tote pick list is assigned a sequence number along the pick path through an inventory picking area, wherein the sequence number represents a relative position of the pick location along the pick path.

3. The computer-readable storage medium of claim 2, where the difference between a first sequence number assigned to a first pick location and a second sequence number assigned to a second pick location represents a distance along the pick path between the first pick location and the second pick location.

4. The computer-readable storage medium of claim 1, wherein the set of pending pick lists comprises tote pick lists for all open orders in a merchant system.

5. The computer-readable storage medium of claim 1, wherein the set of pending pick lists comprises tote pick lists from all orders having a same priority.

6. The computer-readable storage medium of claim 1, wherein the set of pending pick lists comprises tote pick lists from all orders scheduled for departure by a certain time.

7. The computer-readable storage medium of claim 1, wherein the set of pending pick lists comprises tote pick lists identifying items stocked in a same inventory storage area.

8. The computer-readable storage medium of claim 1, wherein the set of pending pick lists comprises tote pick lists for totes scheduled to be delivered on a same truck.

9. A computer-implemented method of optimizing pick-to-tote operations, the method comprising executing instructions in a computer system to perform the operations of:
   receiving a tote count at the computer system;
   selecting a first tote pick list at the computer system from a set of pending pick lists;
   selecting an additional tote pick list at the computer system adding the least to an overall sequence number range of the selected pick lists from the set of pending pick lists, wherein the sequence number range of the selected pick lists represents a maximum distance along a pick path between pick locations for items identified in the selected picks lists; and
   repeating the selection of additional tote pick lists at the computer system until the number of the selected pick lists equals the tote count.

10. The computer-implemented method of claim 9, wherein each pick location for items identified in the tote pick list is assigned a sequence number along the pick path through an inventory picking area, wherein the sequence number represents a relative position of the pick location along the pick path.

11. The computer-implemented method of claim 10, where the difference between a first sequence number assigned to a first pick location and a second sequence number assigned to a second pick location represents a distance along the pick path between the first pick location and the second pick location.

12. The computer-implemented method of claim 9, wherein the first tote pick list comprises the tote pick list from the set of pending pick lists having a narrowest sequence number range.

13. The computer-implemented method of claim 9, wherein the first tote pick list comprises the tote pick list from the set of pending pick lists having a related order with a highest priority.

14. The computer-implemented method of claim 9, wherein the first tote pick list comprises the tote pick list from the set of pending pick lists having a related order with an earliest delivery date.

15. A system for optimizing a pick-to-tote operation, the system comprising:
   a merchant system comprising one or more application servers; and
   a pick-to-tote optimization module executing on the one or more application servers and configured to select a plurality of tote pick lists for the pick-to-tote operation from a set of pending pick lists such that a range of sequence numbers assigned to the pick locations for the items identified in the selected plurality of tote pick lists is minimized, wherein the sequence number assigned to each pick location represents a relative position of the pick location along a pick path through the inventory picking area.

16. The system of claim 15, where the difference between a first sequence number assigned to a first pick location and a second sequence number assigned to a second pick location represents a distance along the pick path between the first pick location and the second pick location.

17. The system of claim 15, wherein the set of pending pick lists comprises tote pick lists from all orders having a same priority.

18. The system of claim 15, wherein the set of pending pick lists comprises tote pick lists from all orders scheduled for departure by a certain time.

19. The system of claim 15, wherein the set of pending pick lists comprises tote pick lists identifying items stocked in a same inventory storage area.

20. The system of claim 15, wherein the set of pending pick lists comprises tote pick lists for totes scheduled to be delivered on a same truck.

\* \* \* \* \*